United States Patent

[11] 3,619,464

[72] Inventors: Wolfgand Holzgruber, Kapfenberg; Peter Machner, Leoben; Wolfgang Hladny, Kapfenberg; Otmar Kleinhagauer, Kapfenberg, all of Austria
[21] Appl. No. 8,379
[22] Filed Feb. 3, 1970
[45] Patented Nov. 9, 1971
[73] Assignee Gebruder Boehler & Co. A. G. Kapfenberg, Austria

[54] APPARATUS FOR ELECTROSLAG REMELTING OF METALS AND IN PARTICULAR STEEL
3 Claims, 10 Drawing Figs.

[52] U.S. Cl. ................................................. 13/12
[51] Int. Cl. ............................................. H05b 3/60
[50] Field of Search ............................ 13/9 ES, 12; 219/73, 131, 126

[56] References Cited
UNITED STATES PATENTS
3,395,237  7/1968  Orton ........................... 13/12
FOREIGN PATENTS
1,540,339  8/1968  France ......................... 13/9 ES Primary Examiner—Bernard A. Gilheany
Assistant Examiner—R. N. Envall, Jr.
Attorney—Arthur O. Klein ABSTRACT: An apparatus for electroslag remelting metals, and in particular steels. Two electrodes or electrode groups are mounted in a mold containing a bath of liquid slag and are being fed with current via two or more thyristor circuits which supply the two electrodes or electrode groups with a single-phase alternating-current, the direction of which changes periodically.

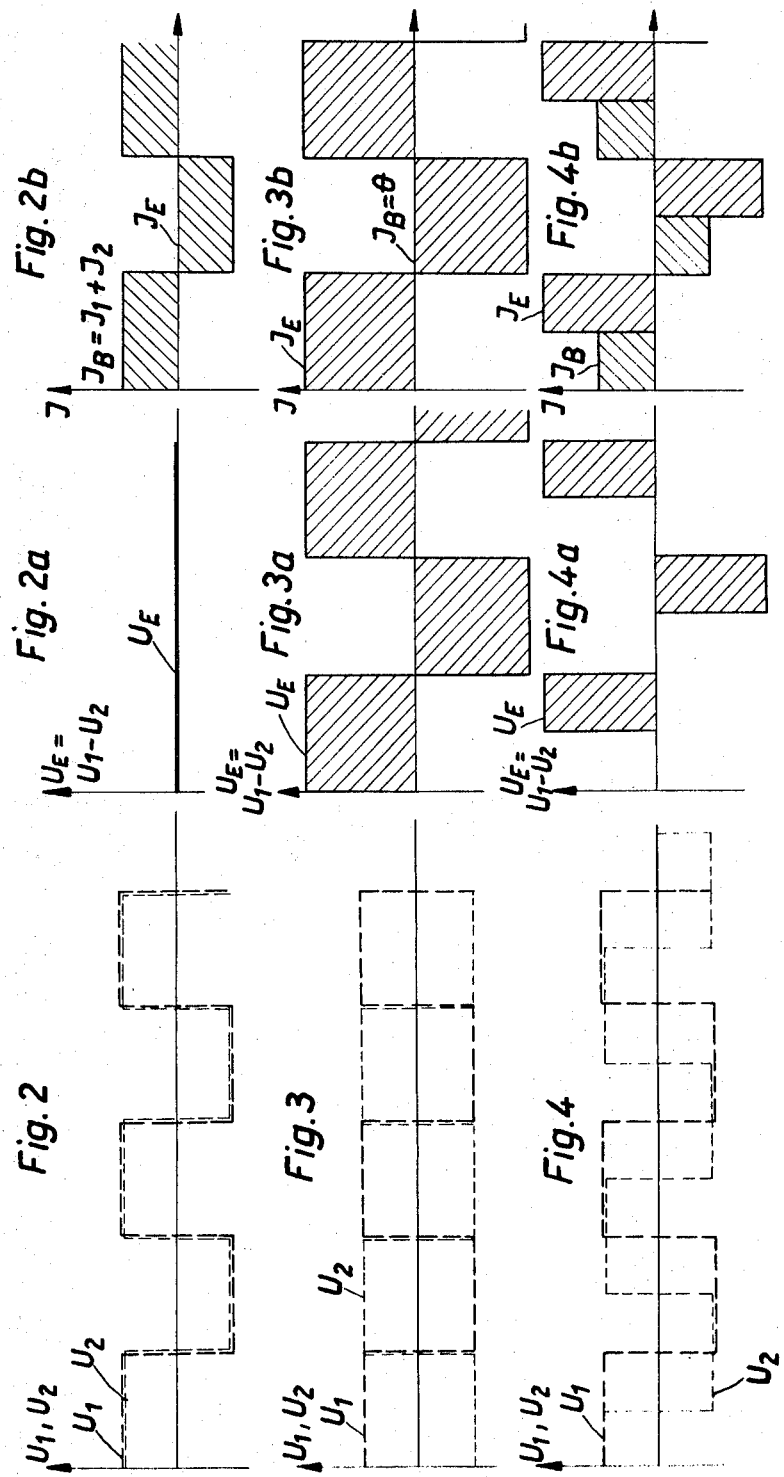

APPARATUS FOR ELECTROSLAG REMELTING OF METALS AND IN PARTICULAR STEEL

BACKGROUND OF THE INVENTION

The known installations for electroslag remelting metals by fusing down an electrode frequently use an arrangement in which the electrode constitutes one pole for the flowing current and the 2 plate on which the mold is supported constitutes to other pole. The electrode is fused down in a bath of liquid E which is stored in the mold so that a layer-by-layer with of metal occurs which forms a gradually increasing metal ingot supported on the base plate. The to be fused down electrode is connected to one pole and the baseplate to another pole of a power supply circuit, for example, the secondary winding of a transformer by means of certain electrical connections (see our pending patent application Ser. No. 814,376, filed Apr. 8, 1969).

There is also known an electroslag remelting installation for metals in which the two ends of the secondary winding of a transformer are respectively connected to two separate electrodes which are to be fused down in a bath of liquid slag stored in a mold.

The electroslag remelting installations for metals forming part of the prior art operate at relatively slow speed because, it has been found, that the cleaning action of the slag will not be satisfactory if the speed at which the electrode is fused down exceeds a predetermined value.

SUMMARY OF THE INVENTION

It is a general object of this invention to provide an apparatus for electroslag remelting of metals in which the aforedescribed drawback has been virtually eliminated.

It is another, more specific object of this invention to provide an apparatus for electroslag remelting of metals which operates at a high fusing velocity with regard to the electrode, when compared to the fusing velocities of the installations of the prior art, while at the same time maintaining a high quality of purity in the end product.

The power consumption of the apparatus of this invention (in kilowatt-hours per ton) of the molten metal is relatively small. The installation of this invention includes two or more thyristor circuits which supply single-phase alternating-current to a pair of electrodes or a pair of groups of electrodes, the direction of which is periodically changed. Each one of the thyristor circuits has a pair of output terminals one of which is connected to one of the electrodes or group of electrodes and the other one of which is connected to the baseplate of the mold on which the ingot of cast metal is gradually forming.

BRIEF DESCRIPTION OF THE DRAWING

The invention is illustrated by way of examples in the accompanying drawing which forms part of this application and in which:

FIG. 2 illustrates a curve which shows the changes of the instantaneous values of the voltages $U_1$ respectively $U_2$ formed between the electrodes 9 respectively 9' and the base plate 14 with respect to the time $t$;

FIG. 2a illustrates a curve which shows the changes of the instantaneous values of the voltage $U_E=U_1-U_2$ formed between both electrodes 9 and 9' with respect to the time $t$;

FIG. 2b illustrates a curve which shows the changes of the instantaneous values of the electric current $J_B=J_1+J_2$ which flows from both electrodes 9 and 9' to the base plate 14 as well as the current $J_E$ which flows from the electrode 9 to the electrode 9' with respect to time $t$;

FIGS. 3, 3a and 3b, as well as FIGS. 4, 4a and 4b show the aforedescribed instantaneous values at different adjustments of the control element 7 which will be described hereinbelow.

DESCRIPTION OF PREFERRED EMBODIMENTS

Figure 1:
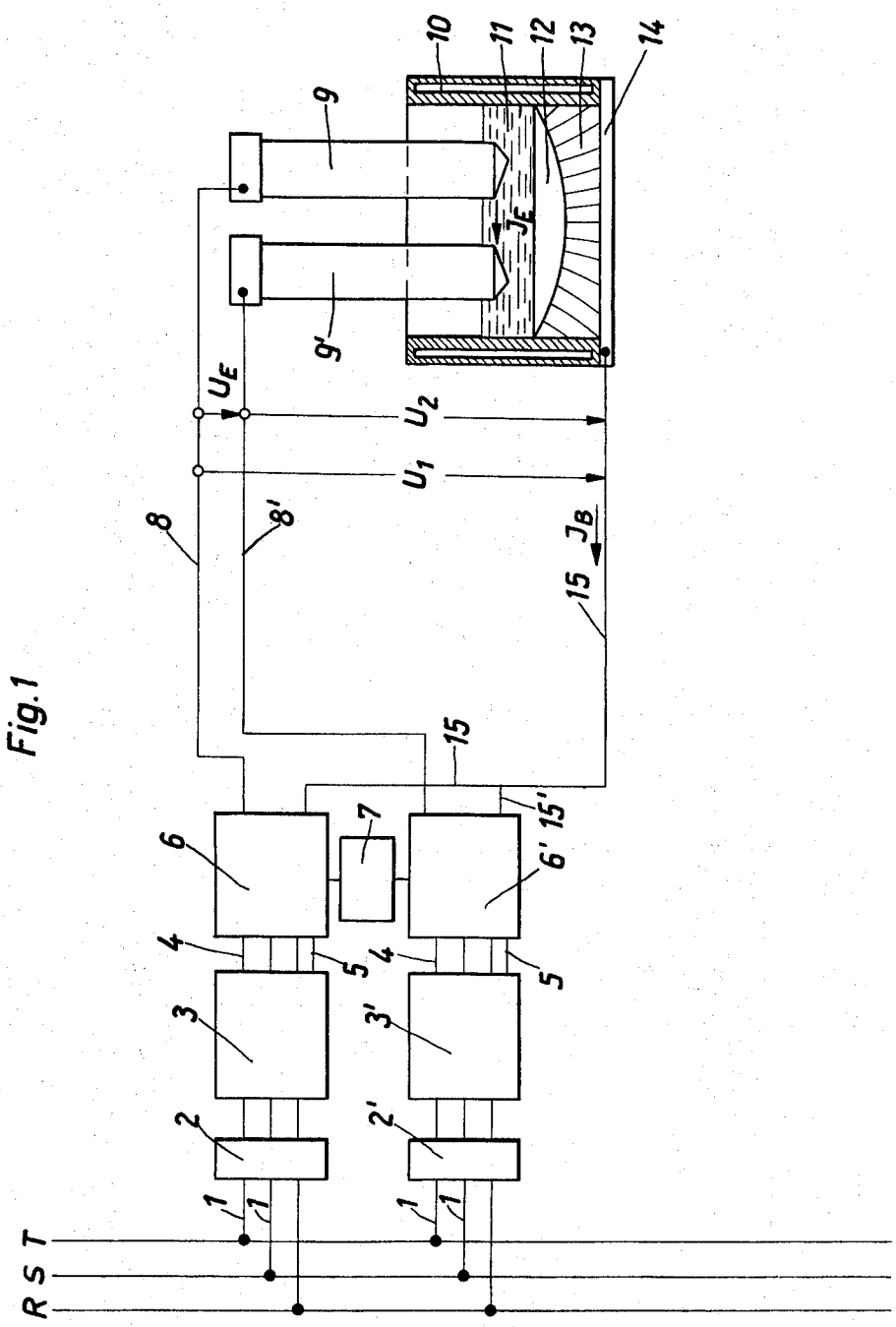
FIG. 1 is a schematic side elevational and sectional view of an installation in accordance with this invention.

Referring now specifically to the embodiment illustrated in FIG. 1, there is shown a normal three-phase power supply current which has feed lines R, S and T (which has a normal circuit frequency of, for example, 50 cycles per second). This three-phase power supply current is transformed by means of two three-phase transformers 3 and 3' into a current having a substantially lower voltage. The two transformers 3 and 3' are connected at the side of their primary windings in parallel. The secondary windings of each three-phase transformer 3 and 3' is connected, depending on what embodiment of the circuit is selected, to either three or, for example, six main conductor lines 4 which conduct the current to the known thyristor circuit, 6' respectively. Furthermore, a line 5 is also connected from the star point of the three-phase transformer 3, 3', respectively to the thyristor circuit 6, 6', respectively. The mechanical or electronic control element 7 is connected to both of the thyristor circuits 6 and 6' and aides in converting the three or six-phase alternating current systems into two single-phase alternating currents. The thyristor circuits 6 and 6' have respectively output lines 8 and 8' which respectively lead the converted single-phase alternating current to two electrodes 9 and 9'. The two electrodes 9 and 9' are eccentrically mounted, as illustrated in FIG. 1, in the water-cooled mold 10 which contains a bath of molten slag 11. The bottom of the mold 10 is formed by a base plate 14 made of copper, on which the metal ingot 13 is formed. The thyristor circuits 6 and 6' furthermore, respectively have output lines 15 and 15' which are connected to the baseplate 14. The primary windings of the three-phase transformers 3 and 3' are connected to the power supply circuit R S and T via conductor lines 1 and two three-pole switches 2 and 2'. These switches can interrupt the current flowing to the transformers 3 and 3'. The voltages $U_1$ and $U_2$ which form potential differentials between the electrodes 9 and 9' and the baseplate 14 due to the current delivered from the thyristor circuits 6 and b' change their direction periodically, whereby the phase displacement which is present between them can be adjusted at will with the aide of the control element 7.

If, as is illustrated in FIG. 2, the two voltages $U_1$ and $U_2$ are in phase, and furthermore, have equal values at each point in time $t$, then the potential $U_E$ existing between the electrodes 9 and 9' as well as the current $J_E$ flowing from electrode 9 to the electrode 9' is equal to zero. On the other hand, the current $J_B$ which flows from both electrodes 9 and 9' to the base-plate 14 (see FIG. 2a respectively FIG. 2b) changes its direction periodically.

If, as is illustrated in FIG. 3, both of the voltages $U_1$ and $U_2$ are phase-displaced with respect to each other by half a period and have the same maximum values, then the difference in potential $U_E$ between the electrodes 9 and 9' is at all points in time $t$ twice as large as the voltage $U_1$ Consequently, there flows from the electrode 9 to the electrode 9' a current $J_E$ which changes direction periodically, whereas the current $J_B$ flowing from both electrodes 9 and 9' to the baseplate 14 remains at all times zero (see FIG. 3a respectively 3b).

When, as is illustrated in FIG. 4, the phase displacement between the voltages $U_1$ and $U_2$ is smaller than half a period, and when these same voltages $U_1$ and $U_2$ have their maximum values, then the potential $U_E$ which exists between both electrodes 9 and 9' and, consequently, also the magnitude of the current $J_E$ flowing from the electrodes 9 to 9', are only different from zero during those time intervals in which the directions of the voltages $U_1$ and $U_2$ differentiate themselves from each other. In contradistinction thereto, there flows from both electrodes 9 and 9' a current $J_B$ to the baseplate 14 (see FIGS. 4a and 4b) during that time interval in which the voltages $U_1$ and $U_2$ are equal to each other. When the current $J_E$ remains constantly equal to zero (see FIGS. 2, 2a and 2b), then the molten metal 12 in the water-cooled mold 10 forms a liquid mass which has a relatively very deep basin and, in the event the current $J_B$ is at all times zero (see FIGS. 3, 3a and 3b), then there is formed a relatively shallow basin in the mold 10.

It can therefore be stated that, in accordance with the conditions and circumstances described hereinabove, the form of the liquid metal mass 12 and the configuration of the pool formed by it in the mold 10 depends on the phase displacement between the two voltages $U_1$ and $U_2$. Furthermore, it can be noted that, as is illustrated in FIG. 4b, there can be produced large currents in the installation of this invention. Such large currents produce strong magnetic fields which produce in the molten metal mass through which the current flows, strong electrodynamic forces. As a result of these forces acting in the molten metal mass, the latter is torn apart and forms small droplets which can be better purified by the slag in the metal mold 10.

This installation of the invention can be so modified that more than two, for example, three or four thyristor circuits are connected to each electrode or group of electrodes. Furthermore, all of the electrodes can be simultaneously fused down in the same mold. When the electrodes receive, one after the other, in accordance with a certain sequential timing, positive or negative voltages with respect to the baseplate 14, then there is formed a circular electromagnetic field, which brings about stirring in the liquid slag as in the liquid molten metal mass. By controlling the sequence of the positive voltages imparted to the electrodes with respect to the baseplate 14, the direction of the circular motion of the electromagnetic rotating field can be changed and thereby also the direction in which the stirring is carried out. Furthermore, the duration of the stirring in one or the other direction is adjustable by means of this adjustment of the positive voltage imparted to the electrodes.

The installation for electroslag remelting of metals in accordance with this invention offers the following advantages when compared to the installations of the prior art: (a) it is possible to operate the installation at considerable higher melting speeds without detracting from the degree of purity of the metal ingots produced in the remelting process; (b) the energy consumption of the installation of the invention (in kilowatt-hours per ton of remelted metal) is relatively low. In addition thereto, it is possible to produce a particularly favorable consistency in the metal ingots due to the aforedescribed stirring taking place in the metal mold. As a result of the division of the melting current into two current portions $J_E$ and $J_B$, the metal ingots produced with the installation of this invention have particularly good surface properties.

Although our invention has been illustrated and described with reference to the preferred embodiments thereof, we wish to have it understood that it is in no way limited to the details of such embodiments but is capable of numerous modifications with the scope of the appended claims.

What is claimed is:

1. An arrangement for electroslag remelting of metals and in particular steel, comprising in combination,
   a mold containing liquid slag;
   a baseplate disposed in said mold for supporting metal which has solidified in said liquid slag;
   at least two consumable electrodes extending into said liquid slag;
   an electric power source having at least two thyristor circuit means for producing phase-displaced voltages respectively;
   each one of said thyristor circuit means being connected, on the one hand, to an electrode and, on the other hand, to said baseplate, whereby the phase-displaced voltages effect a flowing of a single phase current between said electrodes and said base-plate the direction of which changes periodically.

2. The arrangement as set forth in claim including control means operatively connected to said two thyristor-circuit means for controlling the outputs thereof.

3. The arrangement as set forth in claim 2, wherein said thyristor-circuit means comprises at least three thyristor circuits for each electrode, which sequentially energize in a predetermined manner said electrodes with respect to said base plate with positive and negative voltages, thereby producing a rotating electromagnetic field in said mold which is reversible by adjusting the sequence of energization of the electrodes by means of said control means.

* * * * *